(12) United States Patent
Jiang et al.

(10) Patent No.: US 10,785,098 B1
(45) Date of Patent: Sep. 22, 2020

(54) NETWORK CONFIGURATION USING MULTICAST ADDRESS MODULATION

(71) Applicant: Alibaba Group Holding Limited, George Town (KY)

(72) Inventors: Shiqi Jiang, Hangzhou (CN); Lei Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/811,542

(22) Filed: Mar. 6, 2020

Related U.S. Application Data

(63) Continuation of application No. PCT/CN2020/071607, filed on Jan. 12, 2020.

(30) Foreign Application Priority Data

Apr. 30, 2019 (CN) .......................... 2019 1 0361586

(51) Int. Cl.
*H04L 12/24* (2006.01)
*H04L 12/721* (2013.01)
*H04L 29/06* (2006.01)
*H04L 12/717* (2013.01)
*H04L 12/18* (2006.01)

(52) U.S. Cl.
CPC ...... *H04L 41/0806* (2013.01); *H04L 12/1886* (2013.01); *H04L 41/0886* (2013.01); *H04L 45/42* (2013.01); *H04L 45/566* (2013.01); *H04L 69/22* (2013.01)

(58) Field of Classification Search
None
See application file for complete search history.

(56) References Cited

U.S. PATENT DOCUMENTS 6,606,301 B1 *  8/2003  Muller ................... H04L 47/10
                                                    370/230
2014/0068386 A1 *  3/2014  Chen ..................... H03M 13/05
                                                    714/776
(Continued)

FOREIGN PATENT DOCUMENTS

CN        101427495        5/2009
CN        103124182        5/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Chi H Pham
*Assistant Examiner* — Vladislav Y Agureyev
(74) *Attorney, Agent, or Firm* — Fish & Richardson P.C.

(57) ABSTRACT

This disclosure relates to network configuration using multicast address modulation. In one aspect, a method includes dividing data for completing network configuration of a device. Multiple packets are selected from the divided data. A total length of data in the multiple packets is obtained. Multicast address modulation is performed on indexes of the multiple packets to obtain a multicast target address. Data in the multiple packets is parsed based on the total length of the data in the multiple packets and the multicast target address.

18 Claims, 5 Drawing Sheets

(56) References Cited

U.S. PATENT DOCUMENTS

| | | | | |
|---|---|---|---|---|
| 2014/0101167 A1* | 4/2014 | Qin | ............... | G06F 16/319 |
| | | | | 707/742 |
| 2015/0227922 A1* | 8/2015 | Filler | ............... | G06Q 20/382 |
| | | | | 705/41 |
| 2016/0170886 A1* | 6/2016 | Ma | ............... | G06F 12/0811 |
| | | | | 711/122 |
| 2016/0212507 A1* | 7/2016 | Du | ............... | H04L 1/08 |
| 2017/0230144 A1* | 8/2017 | Wu | ............... | H04L 1/08 |
| 2019/0044844 A1* | 2/2019 | Wu | ............... | H04L 1/0076 |
| 2019/0109787 A1* | 4/2019 | Chen | ............... | H04L 47/266 |
| 2019/0349426 A1* | 11/2019 | Smith | ............... | H04L 67/104 |
| 2020/0133254 A1* | 4/2020 | Cella | ............... | H04L 67/12 |

FOREIGN PATENT DOCUMENTS

| | | |
|---|---|---|
| CN | 102804661 | 4/2015 |
| CN | 110278054 | 9/2019 |

OTHER PUBLICATIONS

Nakamoto, "Bitcoin: A Peer-to-Peer Electronic Cash System," www.bitcoin.org, 2005, 9 pages.

Li et al., "Research on LTcodes and its application in intelligent distribution network", Journal of Yunnan University, 2013, 6 pages (with English Abstract).

Liu et al., "Compressed Image Transmission Based on Systematic Raptor Codes with Unequal Error Protection", Journal of Electronics and Information Technology, Nov. 2013, 6 pages (with English abstract).

Luby et al., "Raptor Forward Error Correction Scheme for Object Delivery", Network Working Goup, Oct. 2007, 47 pages.

PCT International Search Report and Written Opinion in International Application No. PCT/CN2020/071607, dated Apr. 1, 2020, 21 pages (with machine translation).

* cited by examiner

NETWORK CONFIGURATION USING MULTICAST ADDRESS MODULATION

CROSS-REFERENCE TO RELATED APPLICATIONS

This application is a continuation of PCT Application No. PCT/CN2020/071607, filed on Jan. 12, 2020, which claims priority to Chinese Patent Application No. 201910361586.7, filed on Apr. 30, 2019, and each application is hereby incorporated by reference in its entirety.

TECHNICAL FIELD

The present disclosure relates to the field of information technologies, and in particular, to network configuration using multicast address modulation.

BACKGROUND

Internet of Things (IoT) technologies and products are widely used in many fields of production and life, such as smart home, off-line retail, and industrial management. Production and manufacture of IoT devices are rapidly developing. Generally, the IoT devices need to be configured to perform Wi-Fi or Bluetooth network connection. This process is referred to as network configuration.

The network configuration process is a unidirectional communication process, and an information transmitting end cannot determine which data blocks are not correctly received. In a conventional solution, configuration information is linearly divided into several (for example, N) data blocks. Then, the data is rotated from 1 to N and is received by an IoT device, and only after all the N pieces of data are received, a network configuration process can be completed. In an actual environment, some data blocks may not be correctly received because of a transmission error. To enable the IoT device to receive the small amount of data that is not correctly received, the information transmitting end has to continuously rotate all data, causing a large waste of time and resources.

SUMMARY

An object of the present disclosure is to provide network configuration methods and devices, so as to alleviate a problem that an existing information transmitting end continuously rotates all data when an IoT device does not correctly receive data, causing a large waste of time and resources.

According to a first aspect of the present disclosure, a network configuration method is provided, including: dividing data required for completing network configuration, selecting multiple packets from the divided data, and obtaining a total length of data in the multiple packets; performing multicast address modulation on indexes of the multiple packets to obtain a multicast target address; and parsing the data in the multiple packets based on the total length of the data in the multiple packets and the multicast target address, and repeating the previous steps until all the data required for network configuration is parsed.

Further, in the method of the present disclosure, dividing data required for completing network configuration includes: dividing the data required for completing network configuration by using rateless erasure codes.

Further, in the method of the present disclosure, selecting multiple packets from the divided, and obtaining a total length of data in the multiple packets includes: selecting multiple packets from the divided data based on a predetermined probability distribution method; and correspondingly, obtaining a total length of data in the multiple packets includes: performing an exclusive OR operation on the data in the multiple packets to obtain the total length of the data in the multiple packets.

Further, in the method of the present disclosure, performing multicast address modulation on indexes of the multiple packets to obtain a multicast target address includes: traversing the indexes of the multiple packets; performing a displacement operation on each index to accumulate a result of a previous index to obtain a result of the indexes of the multiple packets; and using the result of the indexes of the multiple packets as the multicast target address.

Further, in the method of the present disclosure, the method further includes: generating a multicast packet based on the multicast target address and the total length of the data in the multiple packets.

Further, in the method of the present disclosure, parsing the data in the multiple packets based on the total length of the data in the multiple packets and the multicast target address, and repeating the previous steps until all the data required for network configuration is parsed includes: restoring indexes of multiple packets in each multicast packet and a total length of data in the multiple packets; comparing the indexes of the multiple packets in each multicast packet, and performing an exclusive OR operation on the total length of the data in the multiple packets in each multicast packet; parsing the data in the multiple packets when a result of the exclusive OR operation is 1; and repeating the previous steps until all the data required for network configuration is parsed.

According to a second aspect of the present disclosure, a network configuration device is provided, including: a division module, configured to divide data required for completing network configuration, select multiple packets from the divided data, and obtain a total length of data in the multiple packets; a multicast address modulation module, configured to perform multicast address modulation on indexes of the multiple packets to obtain a multicast target address; and a data parsing module, configured to parse the data in the multiple packets based on the total length of the data in the multiple packets and the multicast target address, and repeat the previous steps until all the data required for network configuration is parsed.

Further, according to the device of the present disclosure, the division module is configured to: divide the data required for completing network configuration by using rateless erasure codes.

Further, according to the device of the present disclosure, the division module is further configured to: select multiple packets from the divided data based on a predetermined probability distribution method; and perform an exclusive OR operation on the data in the multiple packets to obtain the total length of the data in the multiple packets.

Further, according to the device of the present disclosure, the multicast address modulation module is configured to: traverse the indexes of the multiple packets; perform a displacement operation on each index to accumulate a result of a previous index to obtain a result of the indexes of the multiple packets; and use the result of the indexes of the multiple packets as the multicast target address.

Further, according to the device of the present disclosure, the device further includes: a packet encapsulation length modulation module, configured to generate a multicast packet based on the multicast target address and the total length of the data in the multiple packets.

Further, according to the device of the present disclosure, the data parsing module is configured to: restore indexes of multiple packets in each multicast packet and a total length of data in the multiple packets; compare the indexes of the multiple packets in each multicast packet, and perform an exclusive OR operation on the total length of the data in the multiple packets in each multicast packet; parse the data in the multiple packets when a result of the exclusive OR operation is 1; and repeat the previous steps until all the data required for network configuration is parsed.

According to a third aspect of the present disclosure, a storage medium is provided, where the storage medium stores computer program instructions, and the computer program instructions are executed according to the methods in the present disclosure.

According to a fourth aspect of the present disclosure, a computing device is provided, where the device includes a memory configured to store computer program instructions, and a processor configured to execute the computer program instructions, and when the computer program instructions are executed by the processor, the computing device is triggered to perform the methods in the present disclosure.

According to the network configuration methods and devices provided in the present disclosure, the data required for completing network configuration is divided, and multiple packets are selected from the divided data to obtain a total length of data in the multiple packets, and data division is implemented by using a rateless erasure code scheme; multicast address modulation is performed on indexes of the multiple packets to obtain a multicast target address; the data in the multiple packets is parsed based on the total length of the data in the multiple packets and the multicast target address, and the previous steps are repeated until all the data required for network configuration is parsed. In the present disclosure, the rateless erasure code scheme is integrated with multicast address modulation and packet length modulation, so as to alleviate a problem that all data is continuously rotated when the data is not correctly received at an IoT device, which causes a large waste of time and resources. Therefore, performance of an IoT device in a network configuration process is optimized, redundancy information sending is alleviated, a network configuration success rate is increased, and network configuration time is optimized.

BRIEF DESCRIPTION OF DRAWINGS

Other features, objectives, and advantages of the present disclosure become more clear by reading detailed description of the non-limitative implementations with reference to the following accompanying drawings.

Same or similar reference numerals in the accompanying drawings represent same or similar components.

DESCRIPTION OF IMPLEMENTATIONS

The following describes the implementations of the present disclosure in detail with reference to accompanying drawings.

Before a method in the implementations of the present disclosure is described, terms to be mentioned in the implementations of the present disclosure are first explained in detail.

Wi-Fi is a wireless local area network created in the IEEE 802.11 standard. The Internet of Things (IoT) network is an information carrier network such as the Internet or a conventional telecommunications network, so ordinary objects can perform independent functions implement interconnection and interworking. IoT device network configuration refers to a process of configuring an IoT device so the IoT device can be connected to a Wi-Fi network. Erasure codes are codes used to re-decompose a message from n blocks into more than m blocks, where m is greater than n, and the original message can be reconstructed from block subsets of a new message. Fountain code is a type of the erasure code.

Figure 1:
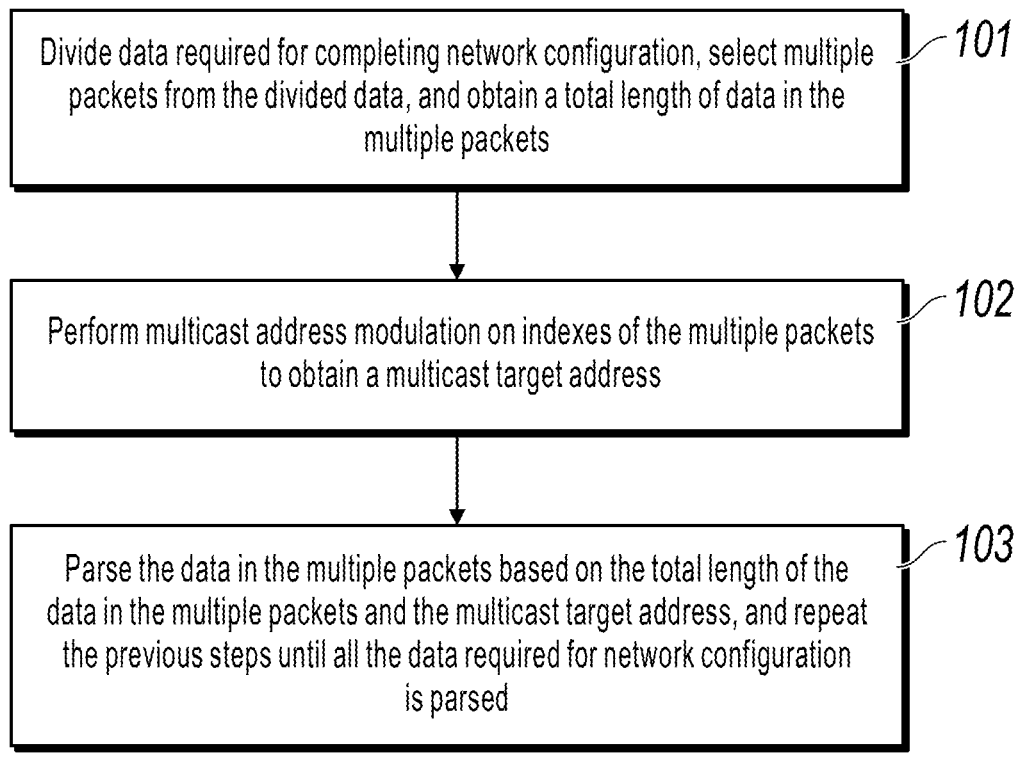
FIG. 1 is a schematic flowchart illustrating a network configuration method, according to an implementation of the present disclosure.

FIG. 1 is a schematic flowchart illustrating a network configuration method, according to an implementation of the present disclosure. As shown in FIG. 1, the network configuration method provided in Implementation 1 of the present disclosure includes:

101. Divide data required for completing network configuration, select multiple packets from the divided data, and obtain a total length of data in the multiple packets.

A network configuration information transmitting end prepares and completes data required for network configuration. The data can be divided in many ways. Different from that in the existing technology, a packet division mode in this implementation is not to linearly divide data into several blocks and perform transmission at a fixed bit rate. Instead, based on a certain probability distribution, this solution does not specify which probability distribution is to be used, which should be selected based on usage, such as Gaussian distribution and uniform distribution.

In addition, in this implementation of the present disclosure, dividing data required for completing network configuration includes: dividing the data required for completing network configuration by using rateless erasure codes. There are multiple implementations for rateless erasure codes, such as Luby transform codes or Raptors codes. This solution does not specify which implementation is to be used.

Selecting multiple packets from the divided, and obtaining a total length of data in the multiple packets includes: selecting multiple packets from the divided data based on a predetermined probability distribution method, such as Gaussian distribution and uniform distribution; and correspondingly, obtaining a total length of data in the multiple packets in step 101 includes: performing an exclusive OR operation on the data in the multiple packets to obtain the total length of the data in the multiple packets.

102. Perform multicast address modulation on indexes of the multiple packets to obtain a multicast target address.

Before multicast address modulation is performed on the indexes of the multiple packets, in this implementation of the present disclosure, the indexes of the multiple packets are first established and recorded. For example, d packets are randomly selected, for example, [d(i), d(j), . . . d(k)]. At the same time, indexes of the randomly selected d packets are recorded as A, where A=[i, j, . . . k], where (i, j, k) is used to transfer the indexes A=[i, j, . . . k] of the selected d packets to a multicast address modulation module.

In step 102, performing multicast address modulation on indexes of the multiple packets to obtain a multicast target address includes the following sub-steps: 1021. Traverse the indexes of the multiple packets; 1022. Perform a displacement operation on each index to accumulate a result of a previous index to obtain a result of the indexes of the multiple packets; and 1023. Use the result of the indexes of the multiple packets as the multicast target address.

103. Parse the data in the multiple packets based on the total length of the data in the multiple packets and the multicast target address, and repeat the previous steps until all the data required for network configuration is parsed.

Because the total length of the data in the multiple packets is known, and the multicast target address is known, the data in the multiple packets can be directly obtained based on the length of the data and the multicast target address. Because the data in the multiple packets is not all the data required for network configuration, operations are repeated in the previous steps until all the data required for network configuration is parsed.

Step 103 can include the following sub-steps in the performing process: 1031. Restore indexes of multiple packets in each multicast packet and a total length of data in the multiple packets; 1032. Compare the indexes of the multiple packets in each multicast packet, and perform an exclusive OR operation on the total length of the data in the multiple packets in each multicast packet; 1033. Parse the data in the multiple packets when a result of the exclusive OR operation is 1; and 1034. Repeat the previous steps until all the data required for network configuration is parsed.

According to the network configuration methods provided in the present disclosure, the data required for completing network configuration is divided, and multiple packets are selected from the divided data to obtain a total length of data in the multiple packets, and data division is implemented by using a rateless erasure code scheme; multicast address modulation is performed on indexes of the multiple packets to obtain a multicast target address; the data in the multiple packets is parsed based on the total length of the data in the multiple packets and the multicast target address, and the previous steps are repeated until all the data required for network configuration is parsed. In the present disclosure, the rateless erasure code scheme is integrated with multicast address modulation and packet length modulation, so as to alleviate a problem that all data is continuously rotated when the data is not correctly received at an IoT device, which causes a large waste of time and resources. Therefore, performance of an IoT device in a network configuration process is optimized, redundancy information sending is alleviated, a network configuration success rate is increased, and network configuration time is optimized.

Figure 2:
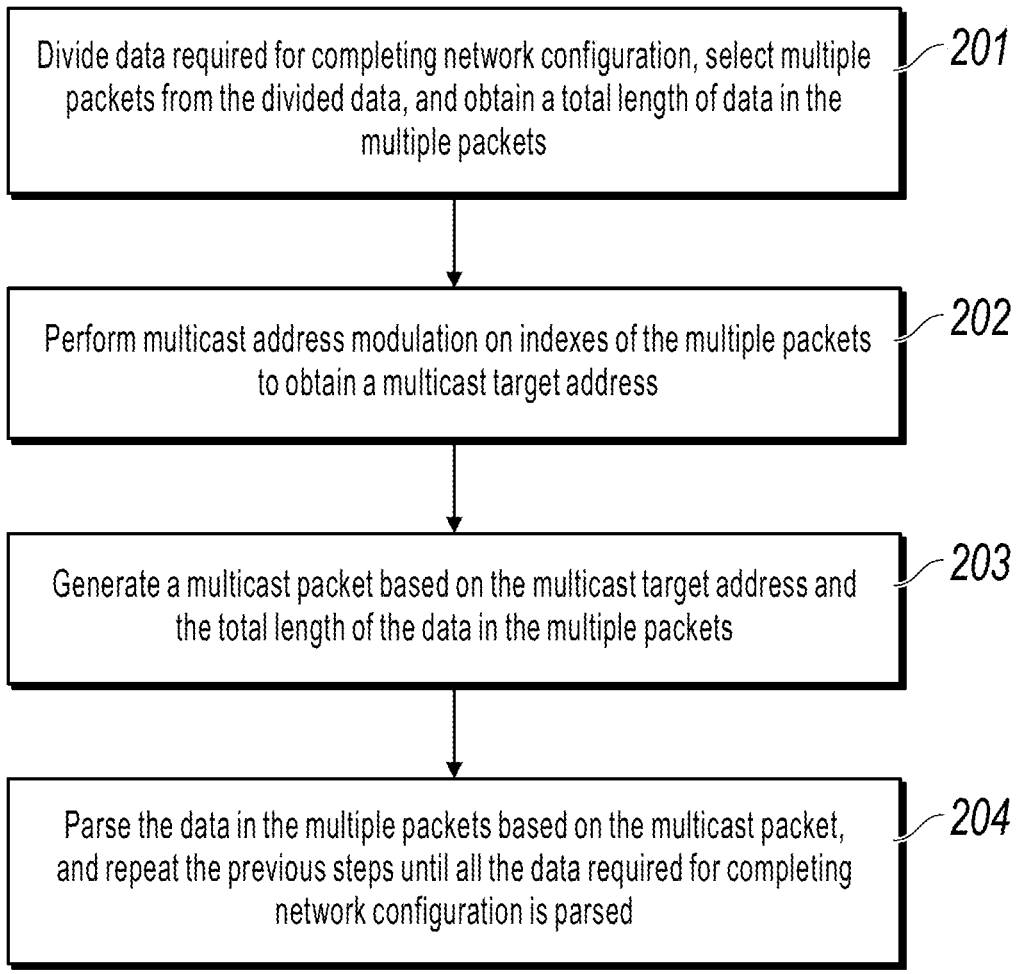
FIG. 2 is a schematic flowchart illustrating a network configuration method, according to another implementation of the present disclosure.

FIG. 2 is a schematic flowchart illustrating a network configuration method, according to an implementation of the present disclosure. As shown in FIG. 2, the network configuration method provided in Implementation 1 of the present disclosure includes:

201. Divide data required for completing network configuration, select multiple packets from the divided data, and obtain a total length of data in the multiple packets.

Figure 3:
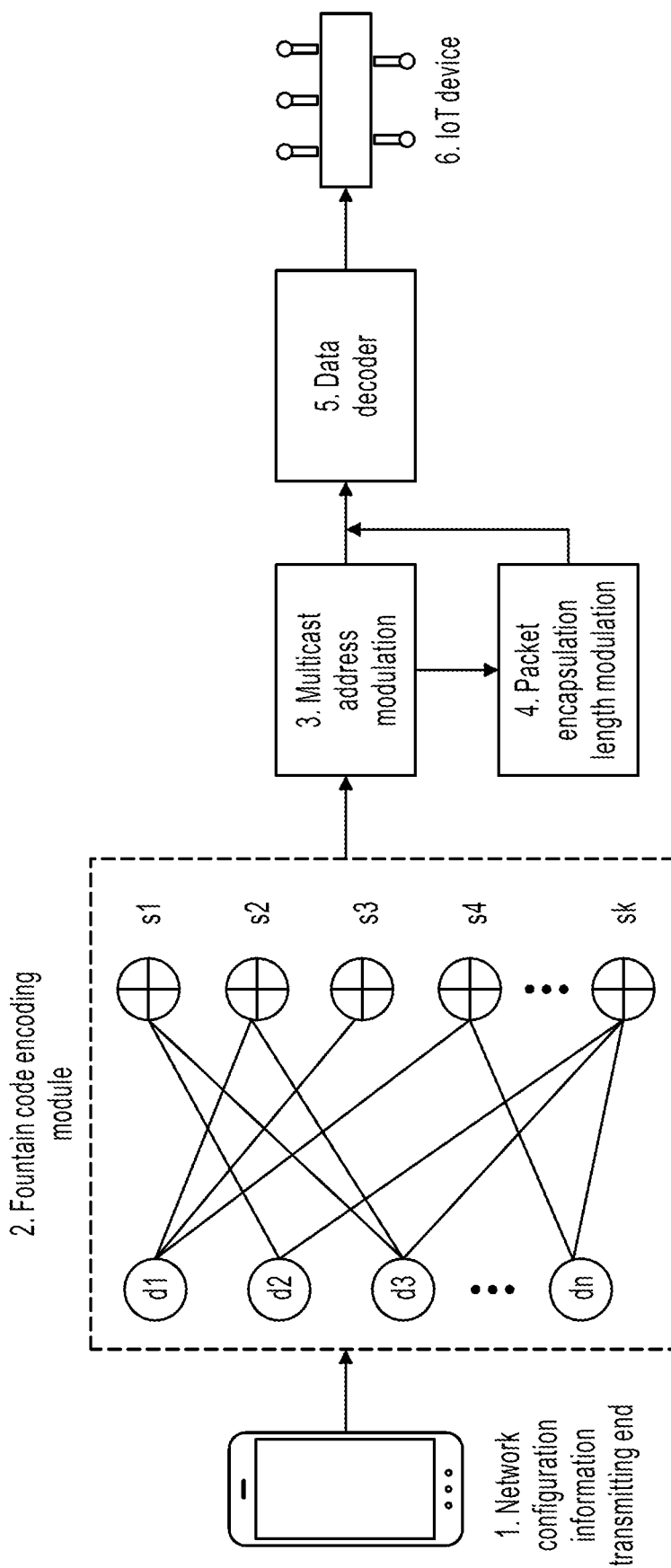
FIG. 3 is a schematic flowchart illustrating a network configuration method, according to another implementation of the present disclosure.

For example, as shown in FIG. 3, a network configuration information transmitting end prepares an IoT device to complete data M required for completing network configuration, and linearly divides data M required for completing network configuration into N (a positive integer greater than or equal to 1) packets. A value of N can be predetermined. In this implementation, N can be selected as a natural number less than or equal to 28 based on an upper limit of code space, and indexes of the packets are 1 to N.

Based on a certain probability distribution, a positive integer d is randomly generated, and d should be less than or equal to N. Based on uniform probability distribution, d packets are randomly selected from the N packets, such as [d(i), d(j), . . . d(k)], and an exclusive OR operation is performed on the d packets to obtain S, that is, S=d(i) xor d(j) xor . . . d(k). At the same time, indexes of the randomly selected d packets are recorded as A, where A=[i, j, . . . k], and (i, j, k) belongs to 1 to N. For example, FIG. 3 shows d1, d2, d3 . . . dn of the d packets and s1, s2, s3, s4 . . . sk in S after the exclusive OR operation. s1 is a result of an exclusive OR operation of d2 and d3, and s2 is a result of an exclusive OR operation of d1 and d3. In this implementation, data of a network configuration information transmitting end is randomized to obtain N packets in a fountain code encoding method. For ease of understanding, for example, if d1 includes data abc, d2 includes data a, and d3 includes data d, s1 is a result ad of an exclusive OR operation of d2 and d3, and s2 is a result abcd of an exclusive OR operation of d1 and d3. If S includes only s1 and s2, S is a result abcd of an exclusive OR operation of s1 and s2, and has a data length 4.

There are multiple implementations of rateless erasure codes. This solution does not specify which implementation is to be used, such as Luby transform codes or Raptors code. Rateless erasure codes can also be implemented by using the fountain code encoding method shown in FIG. 3.

The d packets are selected based on certain probability distribution. This solution does not specify which probability distribution is to be used. Probability distribution should be selected based on usage, such as Gaussian distribution and uniform distribution.

It can be understood that the previous letters n, k, i, and j are all natural numbers greater than or equal to 1. For ease of illustration, their sizes are not limited.

202. Perform multicast address modulation on indexes of the multiple packets to obtain a multicast target address. As shown in the multicast address modulation in FIG. 3, indexes A=[i, j, . . . k] of the selected d packets are transferred to a multicast address modulation module. A is traversed. For index a of each packet in the d packets, after a displacement operation (1<<a) is performed, Q is obtained by accumulating, which is represented by the following pseudo codes:

Q=0
for a in A:
Q=Q+(1<<a)

Because any number a in A is less than or equal to 28 and is not repeated, Q is a number in (0x00 to 0x f ff ff ff), and Q is represented as 0x f: ff: ff: ff and falls within (0:0:0:0 to 16:255:255:255) in a decimal format.

Finally, the first bit on the left is accumulated by an offset 224, so the range of Q is (224:0:0:0-255:255:255:255), and Q is used as the multicast target address.

203. Generate a multicast packet based on the multicast target address and the total length of the data in the multiple packets.

As shown in FIG. 3, packet encapsulation length modulation is used to generate a multicast packet, and information is modulated by using a length of the packet (because the packet cannot be unpacked at a decoder and content in the packet cannot be obtained, the length of the packet is used to modulate the information). The length of the packet is equal to S. The multicast packet is sent. A destination address is Q, and the length of the packet content is S. The total length of the data in the multiple packets includes information S.

204. Parse the data in the multiple packets based on the multicast packet, and repeat the previous steps until all the data required for completing network configuration is parsed.

A data decoder in FIG. 3 receives the multicast packet, restores A from the multicast address, and restores S from the length of the multicast packet. The data decoder continuously receives multicast packets, compares A in each multicast packet, and performs an exclusive OR operation on S in each multicast packet. When a result of the exclusive OR operation is d=1, a data segment d (i) is successfully parsed out.

The transmitting end repeats steps 201, 202, and 203 to generate and send new multicast packets. The multicast packets are received continuously, and the above operations are repeated until all data is parsed out.

In this solution, a rateless erasure code scheme is used, and is integrated with multicast address modulation and packet length modulation to optimize IoT device performance in a network configuration process, alleviate sending redundant information, increase a network configuration success rate, and optimize network configuration time.

According to the network configuration method provided in the present disclosure, the data required for completing network configuration is divided, and multiple packets are selected from the divided data to obtain a total length of data in the multiple packets, and data division is implemented by using a rateless erasure code scheme; multicast address modulation is performed on indexes of the multiple packets to obtain a multicast target address; the data in the multiple packets is parsed based on the total length of the data in the multiple packets and the multicast target address, and the previous steps are repeated until all the data required for network configuration is parsed. In the present disclosure, the rateless erasure code scheme is integrated with multicast address modulation and packet length modulation, so as to alleviate a problem that all data is continuously rotated when the data is not correctly received at an IoT device, which causes a large waste of time and resources. Therefore, performance of an IoT device in a network configuration process is optimized, redundancy information sending is alleviated, a network configuration success rate is increased, and network configuration time is optimized.

Figure 4:
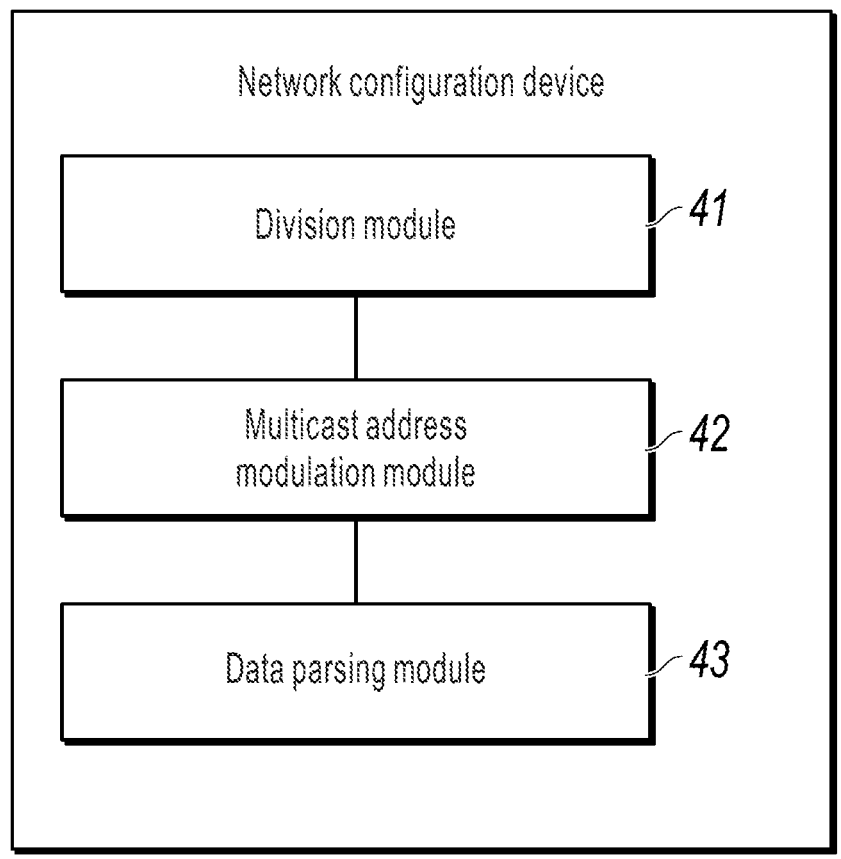
FIG. 4 is a schematic structural diagram illustrating a network configuration device, according to an implementation of the present disclosure.

FIG. 4 is a schematic structural diagram illustrating a network configuration device, according to an implementation of the present disclosure. As shown in FIG. 4, the network configuration device provided in Implementation 1 of the present disclosure includes: a division module 41, configured to divide data required for completing network configuration, select multiple packets from the divided data, and obtain a total length of data in the multiple packets.

A network configuration information transmitting end prepares and completes data required for network configuration. The data can be divided in many ways. Different from that in the existing technology, a packet division mode in this implementation is not to linearly divide data into several blocks and perform transmission at a fixed bit rate. Instead, based on a certain probability distribution, this solution does not specify which probability distribution is to be used, which should be selected based on usage, such as Gaussian distribution and uniform distribution.

In addition, in this implementation of the present disclosure, dividing data required for completing network configuration includes: dividing the data required for completing network configuration by using rateless erasure codes. There are multiple implementations for rateless erasure codes, such as Luby transform codes or Raptors codes. This solution does not specify which implementation to be used.

A multicast address modulation module 42 is configured to perform multicast address modulation on indexes of the multiple packets to obtain a multicast target address.

Before multicast address modulation is performed on the indexes of the multiple packets, in this implementation of the present disclosure, the indexes of the multiple packets are first established and recorded. For example, d packets are randomly selected, for example, [d(i), d(j), . . . d(k)]. At the same time, indexes of the randomly selected d packets are recorded as A, where A=[i, j, . . . k], where (i, j, k) is used to transfer the indexes A=[i, j, . . . k] of the selected d packets to a multicast address modulation module.

A data parsing module 43 is configured to parse the data in the multiple packets based on the total length of the data in the multiple packets and the multicast target address, and repeat the previous steps until all the data required for network configuration is parsed.

Because the total length of the data in the multiple packets is known, and the multicast target address is known, the data in the multiple packets can be directly obtained based on the length of the data and the multicast target address. Because the data in the multiple packets is not all the data required for network configuration, operations of the modules are repeated until all the data required for network configuration is parsed.

According to the network configuration device provided in the present disclosure, the data required for completing network configuration is divided, and multiple packets are selected from the divided data to obtain a total length of data in the multiple packets, and data division is implemented by using a rateless erasure code scheme; multicast address modulation is performed on indexes of the multiple packets to obtain a multicast target address; the data in the multiple packets is parsed based on the total length of the data in the multiple packets and the multicast target address, and the previous steps are repeated until all the data required for network configuration is parsed. In the present disclosure, the rateless erasure code scheme is integrated with multicast address modulation and packet length modulation, so as to alleviate a problem that all data is continuously rotated when the data is not correctly received at an IoT device, which causes a large waste of time and resources. Therefore, performance of an IoT device in a network configuration process is optimized, redundancy information sending is alleviated, a network configuration success rate is increased, and network configuration time is optimized.

Figure 5:
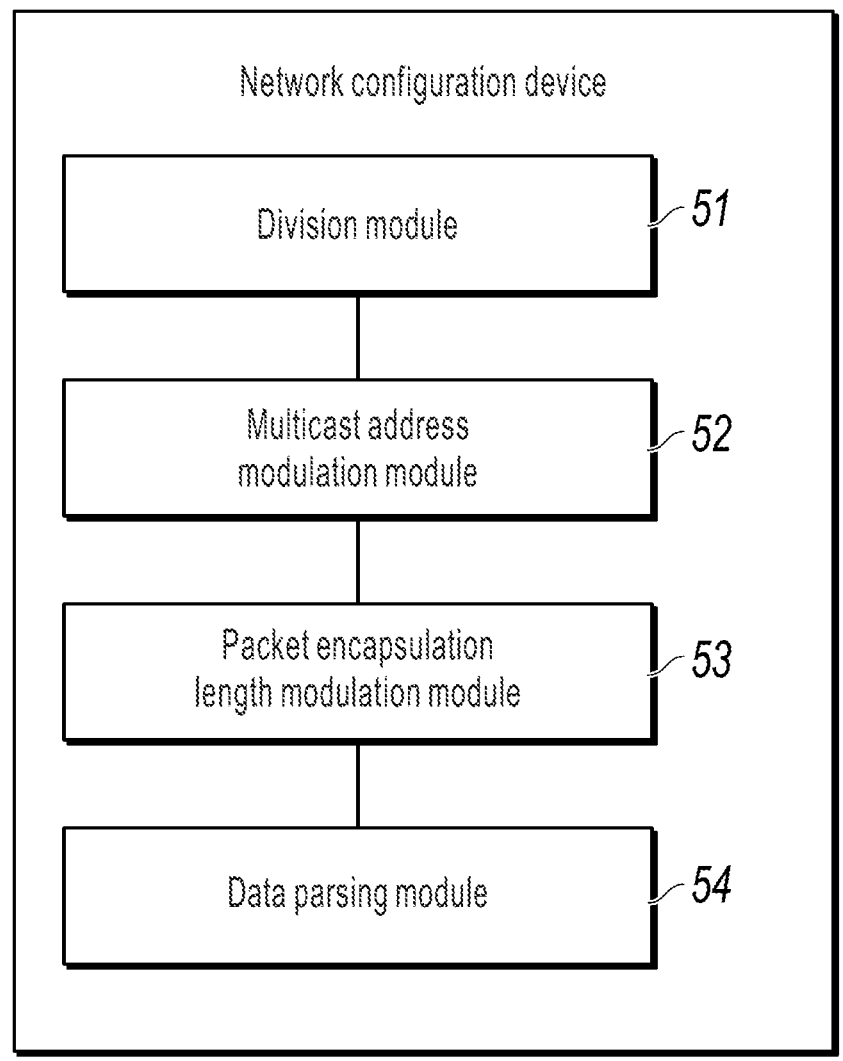
FIG. 5 is a schematic structural diagram illustrating a network configuration device, according to another implementation of the present disclosure.

FIG. 5 is a schematic structural diagram illustrating a network configuration device, according to an implementation of the present disclosure. As shown in FIG. 5, the network configuration device provided in Implementation 1 of the present disclosure includes: a division module 51, configured to divide data required for completing network configuration, select multiple packets from the divided data, and obtain a total length of data in the multiple packets; a multicast address modulation module 52, configured to perform multicast address modulation on indexes of the multiple packets to obtain a multicast target address; a packet encapsulation length modulation module 53, configured to generate a multicast packet based on the multicast target address and the total length of the data in the multiple packets; and a data parsing module 54, configured to parse the data in the multiple packets based on the total length of the data in the multiple packets and the multicast target address, and repeat the previous steps until all the data required for network configuration is parsed.

In a preferred implementation of this implementation of the present disclosure, the division module is configured to: divide the data required for completing network configuration by using rateless erasure codes.

In a preferred implementation of this implementation of the present disclosure, the division module is further configured to: select multiple packets from the divided data based on a predetermined probability distribution method; and perform an exclusive OR operation on the data in the multiple packets to obtain the total length of the data in the multiple packets.

In a preferred implementation of this implementation of the present disclosure, the multicast address modulation module is configured to: traverse the indexes of the multiple packets; perform a displacement operation on each index to accumulate a result of a previous index to obtain a result of the indexes of the multiple packets; and use the result of the indexes of the multiple packets as the multicast target address.

In a preferred implementation of this implementation of the present disclosure, the data parsing module is configured to: restore indexes of multiple packets in each multicast packet and a total length of data in the multiple packets; compare the indexes of the multiple packets in each multicast packet, and perform an exclusive OR operation on the total length of the data in the multiple packets in each multicast packet; parse the data in the multiple packets when a result of the exclusive OR operation is 1; and repeat the previous steps until all the data required for network configuration is parsed.

The devices shown in FIG. 3 and FIG. 4 in the implementations of the present disclosure are implementation devices of the methods shown in FIG. 1 and FIG. 2 in the implementations of the present disclosure. A specific principle of the device is the same as that shown in the methods shown in FIG. 1 and FIG. 2 in the implementations of the present disclosure. Details are omitted here.

An implementation of the present disclosure further provides a storage medium, where the storage medium stores computer program instructions, and the computer program instructions are executed according to the method in the implementation of the present disclosure.

In a typical configuration of the present disclosure, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

An implementation of the present disclosure further provides a computing device, where the device includes a memory configured to store computer program instructions and a processor configured to execute the computer program instructions, and when the computer program instructions are executed by the processor, the computing device is triggered to perform the method in the implementation of the present disclosure.

A computer readable storage medium includes persistent, non-persistent, removable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

It is worthwhile to note that the present disclosure can be implemented in software and/or a combination of software and hardware. For example, the present application can be implemented by using an application-specific integrated circuit (ASIC), a general purpose computer, or any other similar hardware device. In some implementations, a software program in the present disclosure can be executed by a processor, so as to implement the previous steps and functions. Similarly, the software program in the present disclosure (including a related data structure) can be stored in a computer readable recording medium, for example, a RAM memory, a hard disk drive or a DVD-ROM/CD-ROM drive, or a floppy disk and a similar device. In addition, some steps or functions in the present disclosure can be implemented by using hardware, for example, a circuit that cooperates with the processor to execute the steps or the functions.

It is clear to a person skilled in the art that the present disclosure is not limited to the details of the previous example implementations, and the present disclosure can be implemented in another specific form without departing from the spirit or essential feature of the present disclosure. Therefore, the implementations should be considered as illustrative and not restrictive in every aspect, and the scope of the present disclosure is limited by the appended claims, rather than the above description. Therefore, the present disclosure covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. A plurality of units or apparatuses described in the apparatus claims can also be implemented by one unit or apparatus by using software or hardware. The words such as "first" and "second" are used to indicate names instead of any particular order.

What is claimed is:

1. A computer-implemented method for network configuration, comprising:
   dividing data for completing network configuration of a device;
   selecting multiple packets from the divided data;
   obtaining a total length of data in the multiple packets;
   performing multicast address modulation on indexes of the multiple packets to obtain a multicast target address; and
   parsing data in the multiple packets based on the total length of the data in the multiple packets and the multicast target address.

2. The computer-implemented method of claim 1, further comprising:
  generating a multicast packet based on the multicast target address and the total length of data in the multiple packets; and
  sending the multicast packet to a decoder.

3. The computer-implemented method of claim 1, wherein dividing the data for completing network configuration comprises dividing the data for completing network configuration using rateless erasure codes.

4. The computer-implemented method of claim 1, wherein:
  selecting the multiple packets from the divided data comprises selecting multiple packets from the divided data based on a predetermined probability distribution method; and
  determining the total length of data in the multiple packets comprises performing an exclusive OR operation on the data in the multiple packets to obtain the total length of the data in the multiple packets.

5. The computer-implemented method of claim 1, wherein determining the multicast target address by performing multicast address modulation on the indexes of the multiple packets comprises:
  for each index:
    performing a displacement operation on the index; and
    accumulating a result of the displacement operation on the index with an accumulated result for each previous index;
  determining a final accumulated result of the indexes of the multiple packets based on the accumulated result for a final index of the indexes of the multiple packets; and
  using the final accumulated result of the indexes of the multiple packets as the multicast target address.

6. The computer-implemented method of claim 1, wherein parsing the data in the multiple packets based on the total length of the data in the multiple packets and the multicast target address comprises:
  restoring the indexes of the multiple packets in each of multiple multicast packets and the total length of data in the multiple packets;
  comparing the indexes of the multiple packets in each multicast packet;
  performing an exclusive OR operation on the total length of the data in the multiple packets in each multicast packet; and
  parsing the data in the multiple packets in each multicast packet when a result of the exclusive OR operation is a value of one.

7. A non-transitory, computer-readable medium storing one or more instructions executable by a computer system to perform operations comprising:
  dividing data for completing network configuration of a device;
  selecting multiple packets from the divided data;
  obtaining a total length of data in the multiple packets;
  performing multicast address modulation on indexes of the multiple packets to obtain a multicast target address; and
  parsing data in the multiple packets based on the total length of the data in the multiple packets and the multicast target address.

8. The non-transitory, computer-readable medium of claim 7, wherein the operations comprise:
  generating a multicast packet based on the multicast target address and the total length of data in the multiple packets; and
  sending the multicast packet to a decoder.

9. The non-transitory, computer-readable medium of claim 7, wherein dividing the data for completing network configuration comprises dividing the data for completing network configuration using rateless erasure codes.

10. The non-transitory, computer-readable medium of claim 7, wherein:
  selecting the multiple packets from the divided data comprises selecting multiple packets from the divided data based on a predetermined probability distribution method; and
  determining the total length of data in the multiple packets comprises performing an exclusive OR operation on the data in the multiple packets to obtain the total length of the data in the multiple packets.

11. The non-transitory, computer-readable medium of claim 7, wherein determining the multicast target address by performing multicast address modulation on the indexes of the multiple packets comprises:
  for each index:
    performing a displacement operation on the index; and
    accumulating a result of the displacement operation on the index with an accumulated result for each previous index;
  determining a final accumulated result of the indexes of the multiple packets based on the accumulated result for a final index of the indexes of the multiple packets; and
  using the final accumulated result of the indexes of the multiple packets as the multicast target address.

12. The non-transitory, computer-readable medium of claim 7, wherein parsing the data in the multiple packets based on the total length of the data in the multiple packets and the multicast target address comprises:
  restoring the indexes of the multiple packets in each of multiple multicast packets and the total length of data in the multiple packets;
  comparing the indexes of the multiple packets in each multicast packet;
  performing an exclusive OR operation on the total length of the data in the multiple packets in each multicast packet; and
  parsing the data in the multiple packets in each multicast packet when a result of the exclusive OR operation is a value of one.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    dividing data for completing network configuration of a device;
    selecting multiple packets from the divided data;
    obtaining a total length of data in the multiple packets;
    performing multicast address modulation on indexes of the multiple packets to obtain a multicast target address; and parsing data in the multiple packets based on the total length of the data in the multiple packets and the multicast target address.

14. The computer-implemented system of claim 13, wherein the operations comprise:
generating a multicast packet based on the multicast target address and the total length of data in the multiple packets; and
sending the multicast packet to a decoder.

15. The computer-implemented system of claim 13, wherein dividing the data for completing network configuration comprises dividing the data for completing network configuration using rateless erasure codes.

16. The computer-implemented system of claim 13, wherein:
selecting the multiple packets from the divided data comprises selecting multiple packets from the divided data based on a predetermined probability distribution method; and
determining the total length of data in the multiple packets comprises performing an exclusive OR operation on the data in the multiple packets to obtain the total length of the data in the multiple packets.

17. The computer-implemented system of claim 13, wherein determining the multicast target address by performing multicast address modulation on the indexes of the multiple packets comprises:

for each index:
performing a displacement operation on the index; and
accumulating a result of the displacement operation on the index with an accumulated result for each previous index;
determining a final accumulated result of the indexes of the multiple packets based on the accumulated result for a final index of the indexes of the multiple packets; and
using the final accumulated result of the indexes of the multiple packets as the multicast target address.

18. The computer-implemented system of claim 13, wherein parsing the data in the multiple packets based on the total length of the data in the multiple packets and the multicast target address comprises:
restoring the indexes of the multiple packets in each of multiple multicast packets and the total length of data in the multiple packets;
comparing the indexes of the multiple packets in each multicast packet;
performing an exclusive OR operation on the total length of the data in the multiple packets in each multicast packet; and
parsing the data in the multiple packets in each multicast packet when a result of the exclusive OR operation is a value of one.

* * * * *